United States Patent [19]

Remson

[11] Patent Number: 5,789,870
[45] Date of Patent: Aug. 4, 1998

[54] LOW NOISE INVERTER FOR EL LAMP

[75] Inventor: Joseph David Remson, Phoenix, Ariz.

[73] Assignee: Durel Corporation, Chandler, Ariz.

[21] Appl. No.: 644,007

[22] Filed: May 6, 1996

[51] Int. Cl.⁶ .................................................. G05F 1/00
[52] U.S. Cl. .................. 315/194; 315/169.3; 315/169.2; 315/209 R; 363/16; 323/212
[58] Field of Search ........................ 315/169.3, 169.1, 315/169.2, 209 R, 223, 226, 205, 194, 283, 287; 363/16, 134; 323/212, 224

[56] References Cited

U.S. PATENT DOCUMENTS

| | | |
|---|---|---|
| 4,527,096 | 7/1985 | Kindlmann ............................ 315/169.3 |
| 4,982,314 | 1/1991 | Miki .......................................... 363/16 |
| 5,172,032 | 12/1992 | Alessio ................................... 315/169.3 |
| 5,313,141 | 5/1994 | Kimball ................................. 315/169.3 |
| 5,418,434 | 5/1995 | Kamens et al. ...................... 315/169.3 |
| 5,502,357 | 3/1996 | Kimball ................................. 315/209 R |
| 5,559,402 | 9/1996 | Corrigan, III ........................ 315/169.3 |
| 5,576,601 | 11/1996 | Koenck et al. ...................... 315/169.3 |
| 5,581,160 | 12/1996 | Fujita .................................... 315/169.3 |

FOREIGN PATENT DOCUMENTS 63-249895  10/1988  Japan .

*Primary Examiner*—Benny Lee
*Assistant Examiner*—Haissa Philogene
*Attorney, Agent, or Firm*—Paul F. Wille

[57] ABSTRACT

An EL lamp is charged to a first polarity with a series of high voltage pulses, discharged at a controlled rate, charged to a second polarity with a series of high voltage pulses, and discharged at a controlled rate, thereby producing an alternating current through the lamp. A flyback circuit provides the high voltage pulses. The polarity of the pulses is reversed periodically at a low frequency and the EL lamp is prevented from discharging through the flyback circuit by a phase shift circuit that produces a discharge pulse in advance of each change of polarity of the high voltage pulses. The discharge pulse interrupts the high voltage pulses and discharges the EL lamp through a constant current load.

10 Claims, 3 Drawing Sheets ns, *c*
LOW NOISE INVERTER FOR EL LAMP

BACKGROUND OF THE INVENTION

This invention relates to an electroluminescent (EL) lamp and, in particular, to an inverter for powering an EL lamp without causing the lamp to produce sound.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the lamp charges to the applied voltage, the current through the lamp ceases, and the lamp stops producing light.

In portable electronic devices, automotive displays, and other applications where the power source is a low voltage battery, an EL lamp is powered by an inverter which converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the EL lamp, with frequencies between 200 hertz and 1000 hertz being preferred. Ionic migration occurs in the phosphor at frequencies below 200 hertz. Above 1000 hertz, the life of the phosphor decreases at a rate that is inversely proportional to frequency.

The battery voltage limits the voltage which can be produced by an inverter. Converting from three volts to one hundred and twenty volts is difficult without a transformer and a transformer is too bulky and expensive for many applications. To increase the output voltage without a transformer, the prior art teaches using what is known as a "flyback" inverter in which energy stored in an inductor is supplied to the EL lamp as a pulse of small current at high voltage. Current through an inductor is abruptly shut off, causing the induced magnetic field to collapse. The voltage across the inductor is proportional to $L \cdot \delta i / \delta t$. Thus, a low voltage at high current is converted into a high voltage at low current. The voltage on an EL lamp is pumped up by a series of pulses from the inverter.

The unidirectional pulses of current produced by a flyback inverter must be converted into an alternating current in order to power an EL lamp for more than a very short while. The prior art teaches periodically reversing the connections to a lamp to produce an alternating current. In order to reduce the size of the inductor and to meet the frequency constraints described above, an inverter typically periodically reverses current through an EL lamp at low frequency (200–1,000 hz) and pulses the lamp at high frequency (5,000–50,000 hz).

When an EL lamp is lit, the front and rear electrodes are oppositely charged and, therefore, are electrostatically attracted. Each cycle of the AC from an inverter causes a slight but audible movement in the lamp. Thus, an EL lamp acts as an electrostatic speaker. It has been discovered that the sound from an EL lamp is caused by the rapid rise time or the rapid fall time of the pulses applied to the lamp and that a voltage having a sinusoidal or a triangular waveform produces substantially less noise or no noise compared to a pulsed voltage.

One can easily provide a sinusoidal waveform for an EL lamp if the size of the power supply does not matter. An inverter including an LC circuit resonant at low frequency requires an inductor and a capacitor that are physically quite large; too large, for example, for a cellular telephone. Thus, the problem is how to provide a compact inverter and how to obtain a sinusoidal or triangular waveform from a flyback inverter. In either case, the efficiency of the inverter must not be impaired.

In view of the foregoing, it is therefore an object of the invention to provide an inverter for an EL lamp that does not cause the lamp to emit noise.

Another object of the invention is to provide an inverter initiating discharge of an EL lamp just before the charging current reverses.

A further object of the invention is to provide an inverter for producing an output voltage that approximates a sinusoidal waveform without using a circuit resonant at low frequency.

Another object of the invention is to increase the discharge time of an EL lamp.

A further object of the invention is to provide an inverter which smoothly transitions from charging to discharging an EL lamp.

SUMMARY OF THE INVENTION

The foregoing objects are achieved in this invention in which an EL lamp is charged to a first polarity with a series of high voltage pulses, discharged at a controlled rate, charged to a second polarity with a series of high voltage pulses, and discharged at a controlled rate, thereby producing an alternating current through the lamp. The EL lamp is preferably charged by a flyback circuit for providing the high voltage pulses. The polarity of the pulses is reversed periodically at a low frequency and the EL lamp is prevented from discharging through the flyback circuit by a phase shift circuit that produces a discharge pulse in advance of each change of polarity of the high voltage pulses. The discharge pulse interrupts the high voltage pulses and discharges the EL lamp at a controlled rate, preferably through a constant current load.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figures 1, 2:
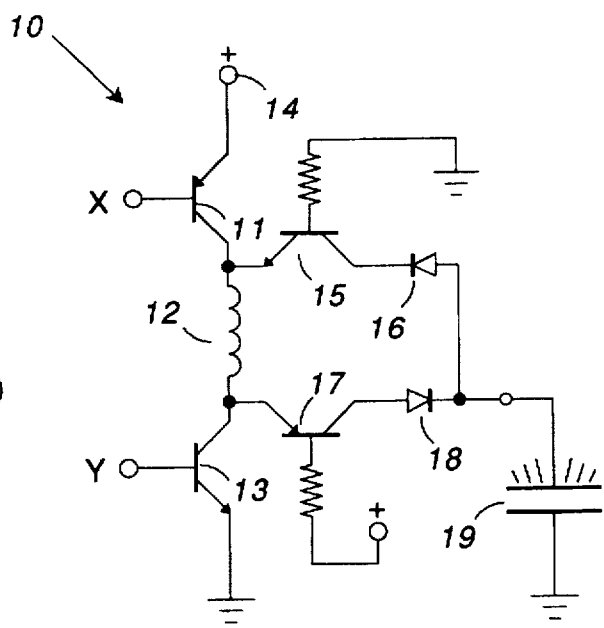
FIG. 1 illustrates an inverter of the prior art for producing alternating current at a single ended output.
FIG. 2 illustrates a integrated circuit version of the inverter of FIG. 1.

FIG. 1 is based upon the disclosure of U.S. Pat. No. 5,313,141 Kimball). Inverter 10 includes transistor 11, inductor 12, and transistor 13 connected in series between voltage source 14 and ground. Inductor 12 is alternately connected through transistors 15 and 17 to lamp 19. Diode 16 is connected in a series with transistor 15 for preventing the transistor from operating in the inverse active mode, i.e. preventing transistor 15 from conducting current from the ground terminal through the forward bias based-collector junction when the voltage on lamp 19 is negative. Similarly, diode 18 prevents transistor 17 from operating in the inverse active mode when the voltage on lamp 19 is positive and greater than the battery voltage.

Logic circuitry (not shown in FIG. 1) provides a series of high frequency pulses that are alternately applied to input lines "X" and "Y". The logic circuitry and the resistors, diodes, and low power transistors shown in FIG. 1 are implemented in an integrated circuit available from Durel Corporation as device type D310. The switching transistors, inductor, and capacitors are external devices coupled to the integrated circuit on a printed circuit board.

Figure 3:
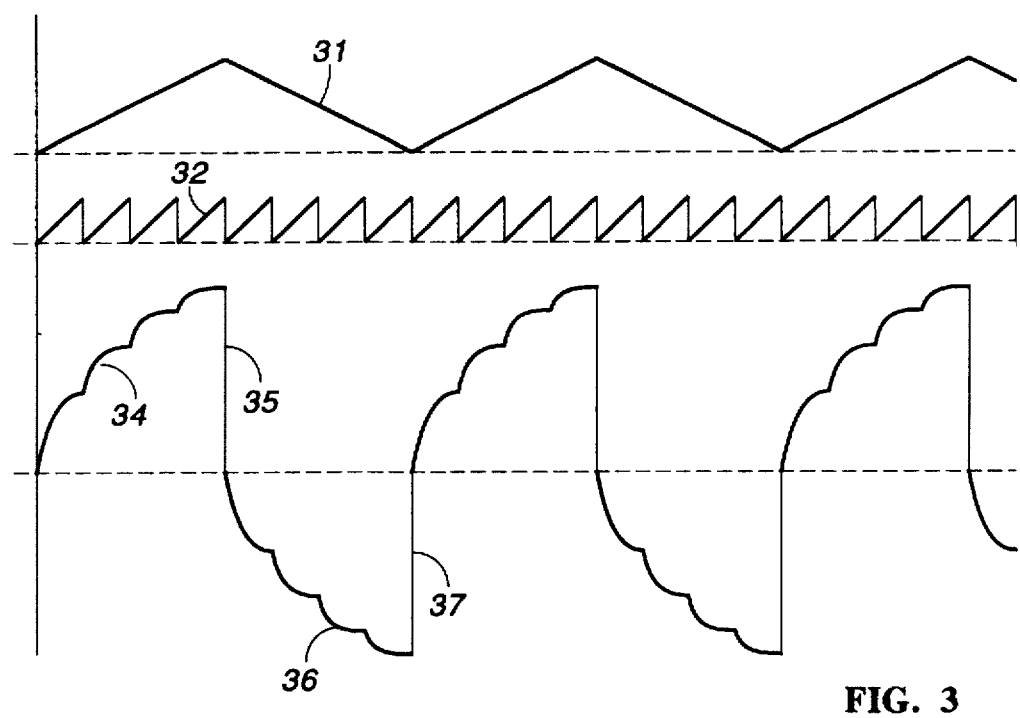
FIG. 3 is a chart of waveforms useful in understanding the operation of the circuit shown in FIG. 2.

FIG. 2 illustrates the salient connections to the integrated circuit. Timing capacitor 21 is part of an RC oscillator producing low frequency pulses and curve 31 in FIG. 3 illustrates the voltage across the capacitor (not the pulses on lines "X" or "Y"). Timing capacitor 23 is part of an RC oscillator producing high frequency pulses and curve 32 in FIG. 3 illustrates the voltage across the capacitor. While high frequency pulses are applied to input "Y", transistor 11 remains conductive. The high frequency pulses turn transistor 13 on and off to pump up the voltage across lamp 19, as illustrated by curve 34 in FIG. 3.

At the end of the half cycle, lamp 19 is abruptly discharged, as indicated by line 35 in FIG. 3. At this point, high frequency pulses are applied to input "X", and transistor 13 remains conductive. The high frequency pulses turn transistor 11 on and off to increase the voltage across lamp 19, as illustrated by curve 36 in FIG. 3. At the end of the half cycle, lamp 19 is abruptly discharged, as indicated by line 37. The high frequency pulses alternate between inputs "X" and "Y" at low frequency, producing a low frequency, alternating current through lamp 19.

Figure 4:
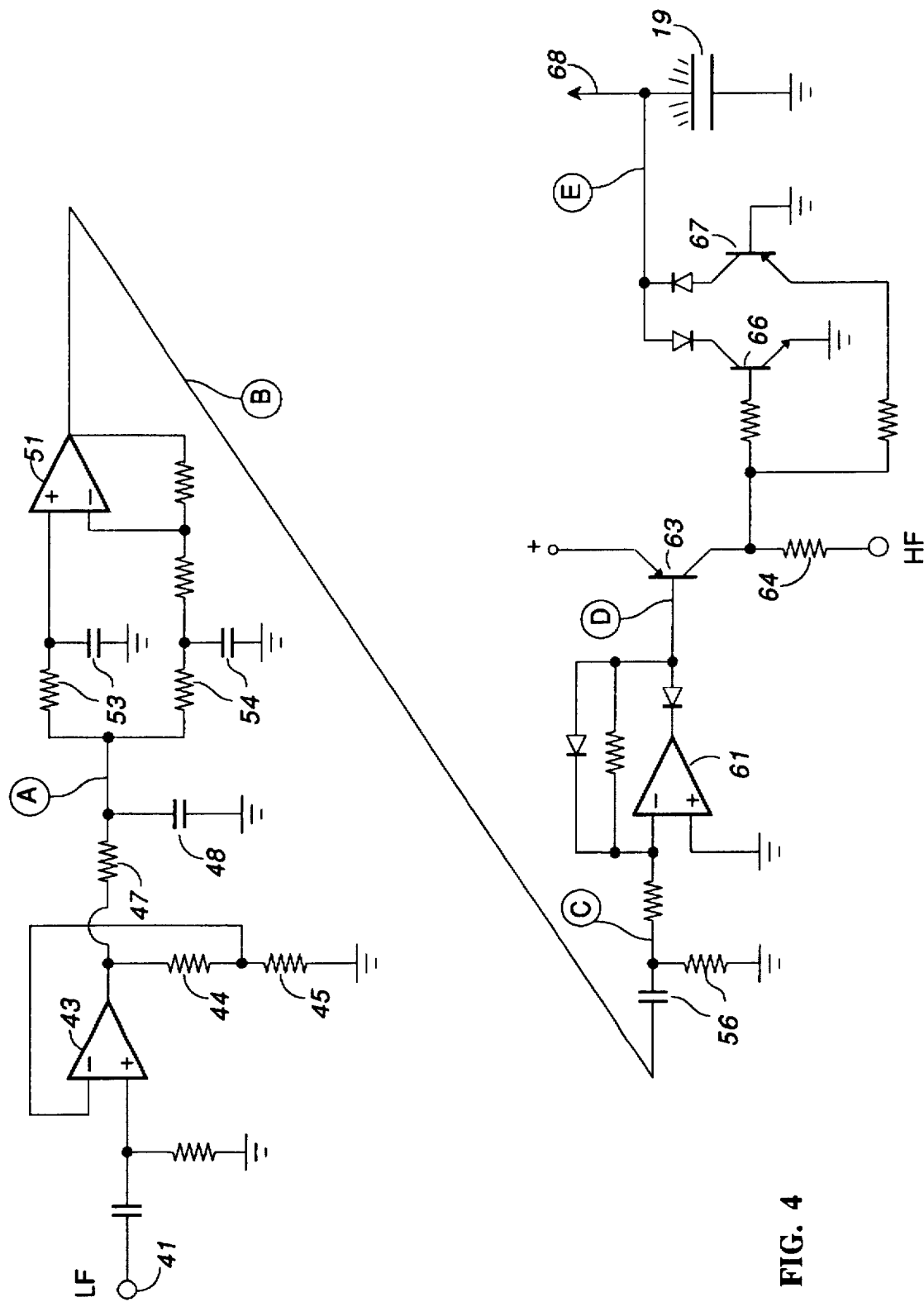
FIG. 4 is a partial schematic of an inverter constructed in accordance with a preferred embodiment of the invention.

It has been found that the pumping portion of each half cycle does not cause an EL lamp to emit a significant amount of sound but that discharging the lamp does cause the lamp to emit sound. FIG. 4 is a schematic of a circuit for controlling an inverter to prevent an EL lamp from emitting sound. Although the circuitry is described in conjunction with the D310 device, other inverters can be similarly controlled to prevent sound emission.

Input 41 is coupled to the low frequency timing pin of the D310 chip (FIG. 2). Waveform 31 (FIG. 3) represents the voltage across capacitor 21 (FIG. 2) and this voltage is coupled to the non-inverting input of amplifier 43. Amplifier 43 provides isolation and amplification and the amplification is determined by the ratio of resistors 44 and 45. The amount of amplification is not critical, and, in one embodiment of the invention, resistors 44 and 45 had the same nominal value, thereby doubling the voltage from input terminal 21.

Resistor 47 and capacitor 48 have an RC time constant that causes a phase shift of the signal from amplifier 43. Specifically, the signal is electrically delayed but logically advanced to provide a pulse a predetermined time prior to the end of a half cycle of the low frequency signal.

Figure 5:
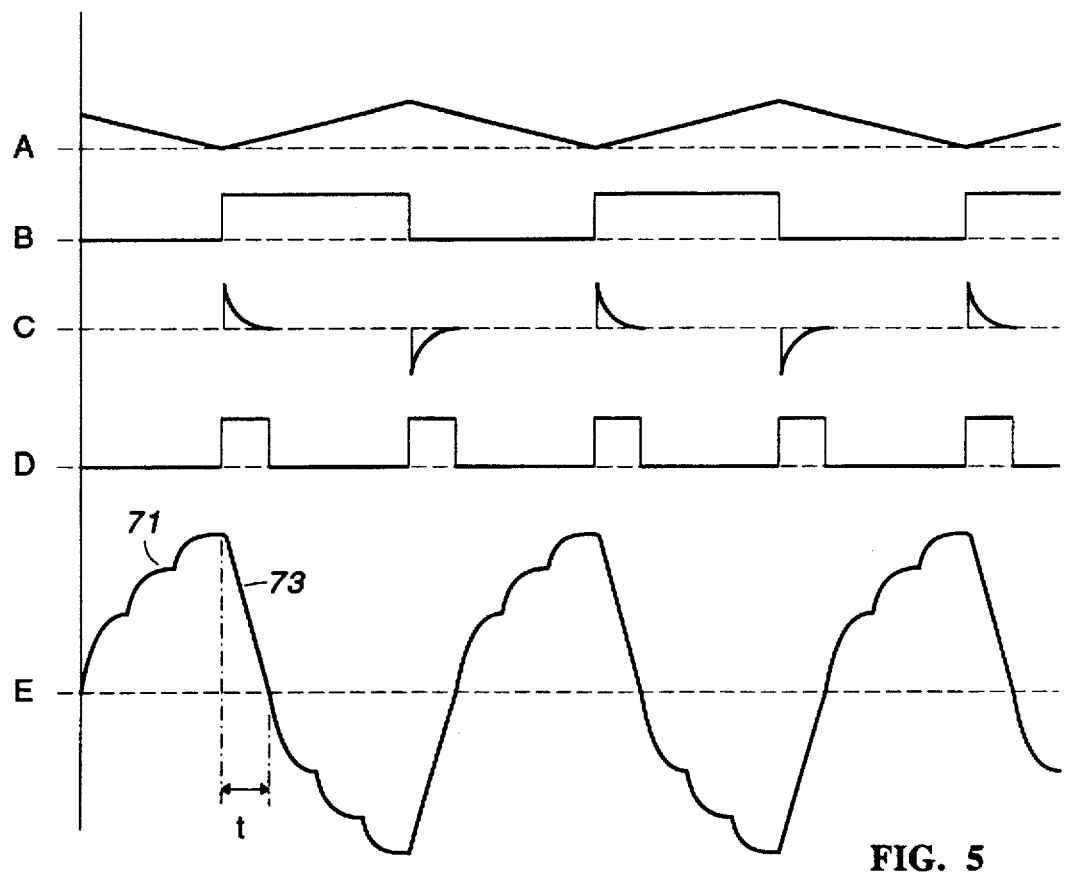
FIGS. 5(A–E) is a chart of waveforms useful in understanding the operation of the circuit shown in FIG. 4.

FIG. 5 is a chart showing voltages at different portions of the circuit illustrated in FIG. 4. The circuitry of FIG. 4 anticipates the end of each half cycle of the low frequency signal to quell the high frequency signal at the end of each half cycle, thereby permitting the lamp to discharge slightly. The circuitry then discharges the lamp through a constant current load, increasing the discharge time of the lamp. Comparing waveform A in FIG. 5 with waveform 31 in FIG. 3, waveform A is delayed almost one half cycle of the low frequency signal, which is the same as advancing the waveform slightly in time.

The output from the phase shift stage is applied to a peak detector including amplifier 51 and RC networks 53 and 54. The time constant of RC networks 53 and 54 are slightly different, enabling amplifier 51 to detect each inflection of waveform A and to change state at each inflection of waveform A. The output of amplifier 51 is represented by waveform B in FIG. 5.

The output from the peak detector stage is applied to differentiator 56, which produces positive and negative spikes, illustrated as waveform C in FIG. 5. The output of differentiator 56 is coupled to a pulse generator including amplifier 61. The diodes on the output of amplifier 61 convert the bi-directional spikes from differentiator 56 into unidirectional pulses, illustrated by waveform D in FIG. 5.

Transistor 63 is coupled through resistor 64 to the high frequency clock pin of chip D310. An RC oscillator depends upon the charging and discharging of a timing capacitor for operation. Transistor 63 disables this operation by pulling capacitor 23 high through resistor 64. Capacitor 23 cannot discharge and the high frequency signal is interrupted. Without a charging pulse, the EL lamp begins to discharge through the internal resistance of the lamp. The timing adjustment produced by the phase shift network assures that the high frequency oscillator is interrupted just before the end of each half cycle of the low frequency signal.

The circuitry preceding transistor 63 in FIG. 4 provides carefully timed pulses in anticipation of each half cycle of the low frequency signal. By anticipating the change in state of the low frequency signal, lamp 19 is prevented from discharging rapidly through the inverter. Instead, the lamp is discharged at a controlled rate through a separate discharge circuit.

When transistor 63 conducts, transistor 66 is turned on, thereby discharging lamp 19. Transistor 66 is not rendered fully conductive but preferably provides a constant current discharge for the lamp. In waveform E (FIG. 5), an EL lamp is pumped to a predetermined voltage, indicated by curve 71, and then the lamp is discharged through a constant current load, indicated by line 73. The constant current load substantially slows the discharge of the lamp and increases the fall time, $\Delta t$, of the voltage. Without a controlled discharge, a EL lamp will discharge in about 10 µs. In accordance with the invention, the discharge time increases to approximately 200 µs. Further, the transition from portion 71 to portion 73 is not abrupt, i.e. the curve is continuous due to the self discharge of the lamp for a brief period.

The width of the pulses to transistor 63 (waveform D) is determined by the time constant of the differentiator. At the end of the pulse, transistor 63 turns off and high frequency pulses are generated. The high frequency pulses are now applied to the "X" output and negative pulses are applied to lamp 19 (FIG. 2). The high frequency pulses continue for almost another half cycle of the low frequency, charging the upper electrode of lamp 19 to a negative voltage. Transistor 63 conducts, shutting off the high frequency and turning on transistor 67 to provide a constant current discharge for lamp 19. The cycle continues, as indicated by waveform E in FIG. 5, simulating a sinusoidal drive voltage and producing no noise from the lamp.

In a typical EL lamp having a thickness between electrodes of 7±2 mils, the applied voltage has a peak of about 125 volts. Under these conditions, a discharge time as long as 50 µs will produce an audible click in a quiet room each time that the lamp is discharged. The lamp is discharged twice during each cycle of the low frequency switching signal and the series of clicks at 400–2000 hz is interpreted as a squeal. Thus, it is preferred that a lamp be discharged at a rate less than 2.5 V/μs.

The loudness of the squeal depends upon a number of variables, e.g. the peak voltage, the thickness of the lamp, the way in which the lamp is mounted, and the size of the cavity in which the lamp is mounted. Because the energy stored in a capacitor is proportional to the square of the voltage ($J=\frac{1}{2} CV^2$), reducing lamp voltage will reduce the sound level but at the expense of brightness. An otherwise identical but thinner lamp requires less energy to vibrate and a lower voltage will produce as loud a sound as made by a thicker lamp. Increasing the discharge time dissipates energy over a longer time and little or no sound is produced. Because energy is proportion to the square of the voltage, one can discharge an EL lamp at a rate less than 2.5 V/μs until the energy remaining in said lamp is less than 50% of the maximum energy stored in said lamp and then discharge the lamp as quickly as desired without producing audible noise.

The invention thus provides a low cost, flyback inverter for driving an EL lamp without noise by providing an approximately sinusoidal or triangular alternating current without using an LC circuit resonant at low frequency. The inverter initiates discharge of the lamp just before the charging current reverses and the discharge time is substantially greater than in the prior art. The inverter transitions smoothly from charging to discharging, further reducing noise emission.

Having thus described the invention, it will be apparent to those of skill in the art that various modifications can be made within the scope of the invention. For example, if the low frequency is derived from the high frequency by a counter/divider, the timed pulses for transistor 63 are easily obtained by counting to a slightly smaller total in a second counter/divider. Although illustrated as an external addition to an existing integrated circuit, the circuitry of FIG. 4 and the rest of the inverter can be incorporated into a single integrated circuit, except for capacitors, inductors, and power transistors.

Instead of discharging an EL lamp at a constant rate, one could slowly discharge the lamp until the voltage on the lamp was reduced and then discharge the lamp rapidly. If the voltage on the lamp is reduced to less than 50 volts, the energy in the lamp is reduced to about 16% of maximum before the lamp is rapidly discharged. For a lamp 7 mils thick normally driven to a peak voltage of 125 volts, rapidly discharging the lamp after the voltage is reduced to 80 volts produces an inaudible sound. In this case, the energy in the lamp is reduced to 41% of the maximum before discharge. Reducing the energy to less than half the maximum should eliminate noise in most EL lamps regardless of mounting. If the EL lamp is discharged at two rates, one can use a simple resistive load instead of a constant current load. A resistive load provides an exponential discharge but the discharge time is not excessive if a controlled then rapid discharge is provided.

What is claimed as the invention is:

1. A low noise inverter for driving an EL lamp, said inverter comprising:

an output for coupling to an EL lamp;

a flyback circuit coupled to said output for providing a first series of high frequency pulses at a first polarity and a second series of high frequency pulses at a second polarity, said pulses changing polarity at a low frequency for producing an alternating current through said lamp;

said flyback circuit including a first source providing a high frequency signal and a second source providing a low frequency signal;

timing means coupled to said first source for interrupting said high frequency signal just before said high frequency pulses change polarity; and discharge means coupled to said timing means and to said output for discharging said EL lamp at a predetermined rate before said high frequency pulses change polarity.

2. The inverter as set forth in claim 1 wherein said discharge means includes a constant current load.

3. The inverter as set forth in claim 1 wherein said timing means includes a phase shift circuit for providing a pulse in advance of said high frequency pulses changing polarity.

4. The inverter as set forth in claim 1 wherein said timing means includes:

a phase shift network coupled to said second source for delaying said low frequency signal;

a peak detector coupled to said phase shift network for producing a pulse each half cycle of said low frequency signal; and a differentiator coupled to said peak detector;

wherein said discharge means is coupled to said differentiator.

5. The inverter as set forth in claim 4 wherein said discharge means includes a constant current load.

6. A method for driving an EL lamp from an inverter without causing the lamp to emit audible sound, said method comprising the steps of:

charging said lamp to a first polarity with a series of high voltage pulses; and interrupting said pulses while discharging said lamp at a controlled rate to reduce physical movement in the lamp, thereby reducing the sound emitted by the lamp.

7. The method as set forth in claim 6 and further including the steps of:

charging said lamp to a second polarity with a series of high voltage pulses; and interrupting said pulses while discharging said lamp at a controlled rate; and repeating said steps to produce an alternating current through said lamp.

8. The method as set forth in claim 7 wherein said lamp is discharged at a constant rate.

9. The method as set forth in claim 7 wherein said lamp is discharged at a rate less than 2.5 V/μs.

10. The method as set forth in claim 9 wherein said lamp is discharged at a rate less than 2.5 V/μs until the energy remaining in said lamp is less than 50% of the maximum energy stored in said lamp.

* * * * *